(12) United States Patent
Fisher

(10) Patent No.: US 8,241,058 B1
(45) Date of Patent: Aug. 14, 2012

(54) REEL FOR MINIMIZING UNREELED CABLE LENGTH

(75) Inventor: Lonnie L. Fisher, Hallstead, PA (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 13/017,183

(22) Filed: Jan. 31, 2011

(51) Int. Cl.
  *H01R 13/72* (2006.01)
(52) U.S. Cl. ........................................... 439/501
(58) Field of Classification Search ............ 439/501, 439/4; 191/12.4
  See application file for complete search history.

(56) References Cited

U.S. PATENT DOCUMENTS

| | | | |
|---|---|---|---|
| 4,734,063 A | 3/1988 | Koch et al. | |
| 6,253,893 B1 | 7/2001 | Chi-Min | |
| 6,254,025 B1* | 7/2001 | Liao | 242/378.1 |
| 6,359,764 B1* | 3/2002 | Chou | 361/93.1 |
| 6,407,933 B1 | 6/2002 | Bolognia et al. | |
| 6,483,033 B1 | 11/2002 | Simoes et al. | |
| 6,503,097 B2* | 1/2003 | Archambault | 439/501 |
| 6,575,781 B2* | 6/2003 | Wen-Hsuan et al. | 439/501 |
| 6,616,524 B2 | 9/2003 | Storck, Jr. et al. | |
| 6,646,893 B1 | 11/2003 | Hardt et al. | |
| 6,733,328 B2* | 5/2004 | Lin et al. | 439/501 |
| 6,778,381 B1 | 8/2004 | Bolognia et al. | |
| 6,969,275 B1 | 11/2005 | Brock | |
| 7,028,939 B2 | 4/2006 | Liao | |
| 7,032,277 B2 | 4/2006 | Rolla et al. | |
| 7,168,573 B2 | 1/2007 | Brown et al. | |
| 7,265,294 B2 | 9/2007 | Tsunoda et al. | |
| 2003/0008550 A1* | 1/2003 | Tse et al. | 439/501 |
| 2009/0014576 A1 | 1/2009 | Jiang | |
| 2009/0268413 A1 | 10/2009 | Lu | |

* cited by examiner

*Primary Examiner* — Tulsidas C Patel
*Assistant Examiner* — Phuongchi Nguyen

(57) ABSTRACT

A reel for connecting a cable to the reel and power connections that includes a winding reel housing that has a biasing member and a connection assembly. The assembly is received in the housing and has an insulator with two recesses, a return barrel terminal and a power barrel terminal. One of the insulator recesses receives a return barrel terminal and the other insulator recess receives a power barrel terminal. The return barrel terminal is connected to a return contact, and the power barrel terminal is connected to a power contact. The power contact is connected to a power output member and the return contact is connected to a return output member. The return barrel terminal is rotateable with the return contact while maintaining electrical contact with the return contact and the power barrel terminal is rotateable with the power contact while maintaining electrical contact with the power contact.

19 Claims, 8 Drawing Sheets

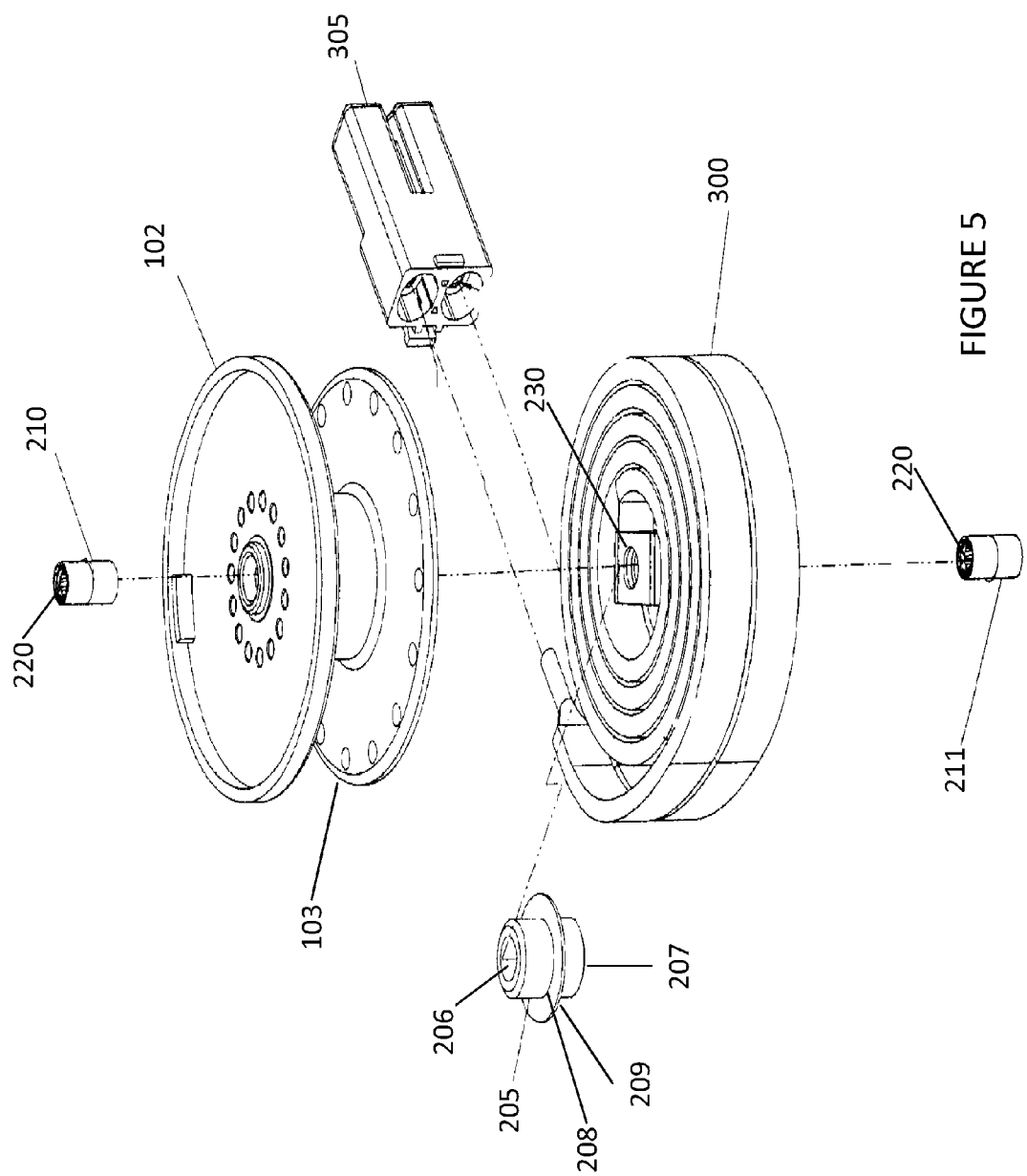

REEL FOR MINIMIZING UNREELED CABLE LENGTH

FIELD OF THE INVENTION

The present invention relates to a reel for winding and unwinding a cable. More specifically, the reel winds and unwinds the cable when opening and closing a drawer containing a device powered by the cable.

BACKGROUND OF THE INVENTION

Electronic devices require power supplied through the attachment of power cables. Computer servers often contain components, such as disk drives that are housed in drawers and also require power cables. To provide access to the components housed in computer server drawers, the drawers typically slide out to expose the interior portions of the component for maintenance. The sliding out process requires a power cable long enough to allow such movement. That extra cable length presents a problem, however, when pushing the server drawer back into the server chassis because the cable may be damaged or may bunch up behind the component, thereby preventing the drawer from being fully closed. To correct this problem, some in the industry have tried articulated arms and harnesses to manage the extra cable length. The set up required for the use of both, however, is time consuming and difficult, and requires a large amount of space. Therefore, a need exists for a compact, self-winding, and easily assembled cable reel with an extended amperage range.

SUMMARY OF THE INVENTION

Accordingly, the present invention provides a reel that includes a winding reel housing that may have a biasing member and an assembly for connecting a cable to the reel and power connections. The assembly may be received in the housing and may have an insulator with opposite first and second recesses, a return barrel terminal and a power barrel terminal. One of the insulator recesses receives a return barrel terminal and the other insulator recess receives a power barrel terminal. The return barrel terminal may be connected to a return contact, and the power barrel terminal may be connected to a power contact. The power contact may be connected to a power output member and the return contact may be connected to a return output member. The return barrel terminal may be rotateable with respect to the return contact while maintaining electrical contact with the return contact and the power barrel terminal may be rotateable with respect to the power contact while maintaining electrical contact with the power contact.

The present invention also provides a reel that may include a winding reel housing with a coil spring mechanism. The reel housing may have a center cylinder with an opening for accepting an assembly for connecting a power cable to the reel and power connections. The assembly may have an insulator symmetrically divided into opposite first and second recesses, the first recess may be adapted to receive a portion of a return barrel terminal and the second recess may be adapted to receive a portion of a power barrel terminal. The assembly also may have a return cable connector and a power cable connector. The return cable connector may be configured with a circular opening to couple with the return barrel terminal, and the power cable connector may be configured with a circular opening to couple with the power barrel terminal. The return barrel terminal may be inserted into the return cable connector circular opening and the power barrel terminal may be inserted into the power cable connector circular opening. The assembled portion of the assembly may be placed inside the reel housing cylinder, a power pin contact may be inserted into the power barrel terminal and a return pin contact may be inserted into the return barrel terminal. The return pin contact may rotate with respect to the return barrel terminal while maintaining electrical contact with the return barrel terminal and the power pin contact may rotate with respect to the power barrel terminal while maintaining electrical contact with the power barrel terminal. The power pin contact may be connected to a power output lug portion and the return pin may be connected to a return output lug portion.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is an exploded view of the assembly illustrated in FIG. 3 showing the assembly with the cable connected;

DETAILED DESCRIPTION OF THE INVENTION

Figure 1:
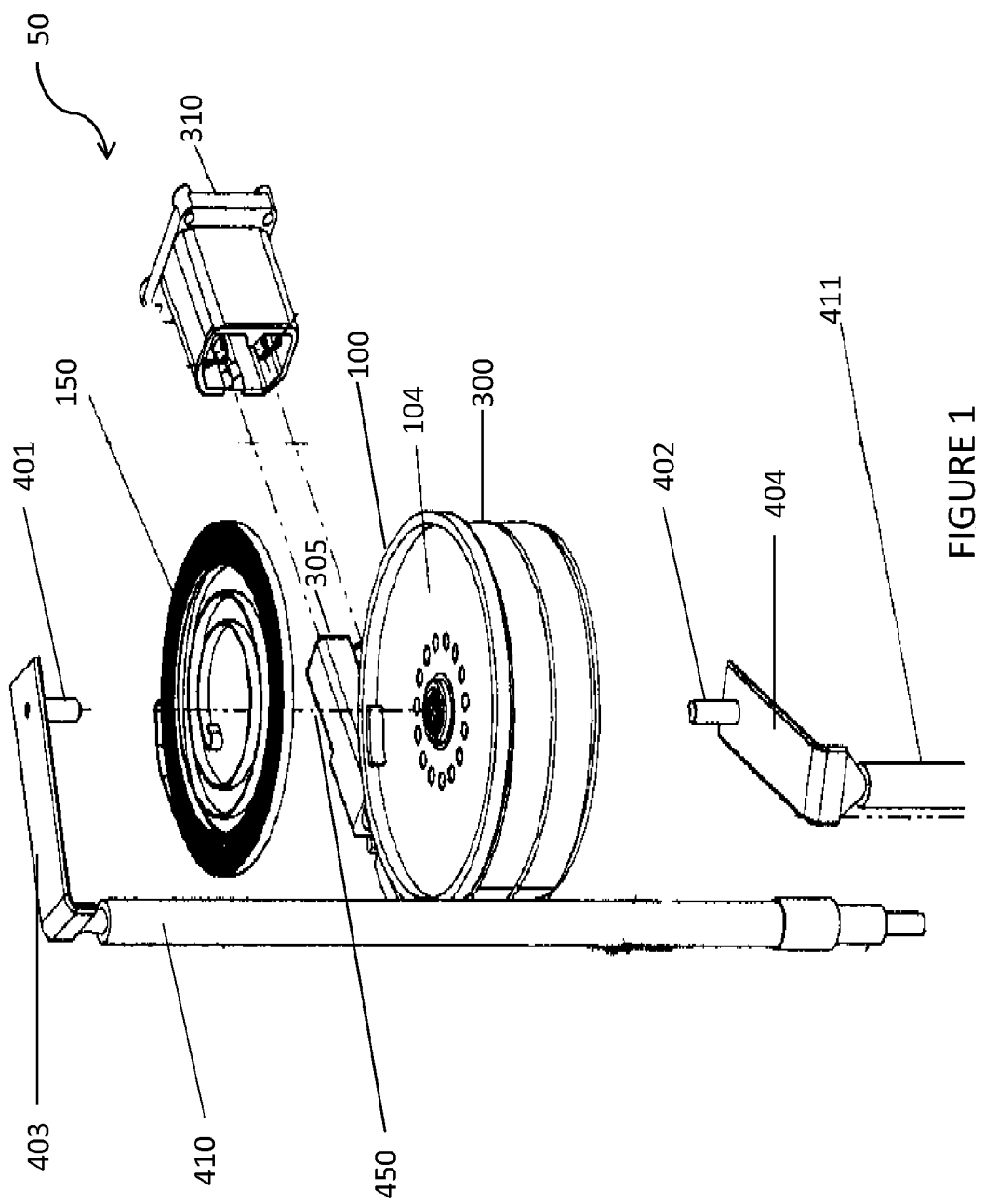
FIG. 1 is an exploded perspective view of an exemplary embodiment of a reel of the present invention.

Referring to FIGS. 1-10, the present invention relates to a reel 50 for maintaining the shortest unreeled cable 300 length while at the same time providing a constant and reliable power source to the component (not shown). The reel 50 also provides a compact footprint inside a component drawer, which conserves space. Additionally, the reel 50 provides unidirectional winding and unwinding without a manually operated apparatus to control the stopping and starting of the winding and unwinding, making such a device usable in a drawer configuration where access to a control mechanism when the drawer is closed is restricted. Also, the reel 50 solves the problem of easily attaching the power cable 300 to the reel and power, and connecting the reel to power for service. Further, the reel 50 provides a much higher amperage range than the prior art.

In general, the reel 50 may include a reel housing 100; a biasing member 150; a cable 300; an assembly 200 (FIGS. 6 and 7) for connecting the cable 300 to a power source; electrical contacts 401 and 402 for providing power to the cable; and output members 410 and 411 with lug portions 403 and 404.

Figure 2:
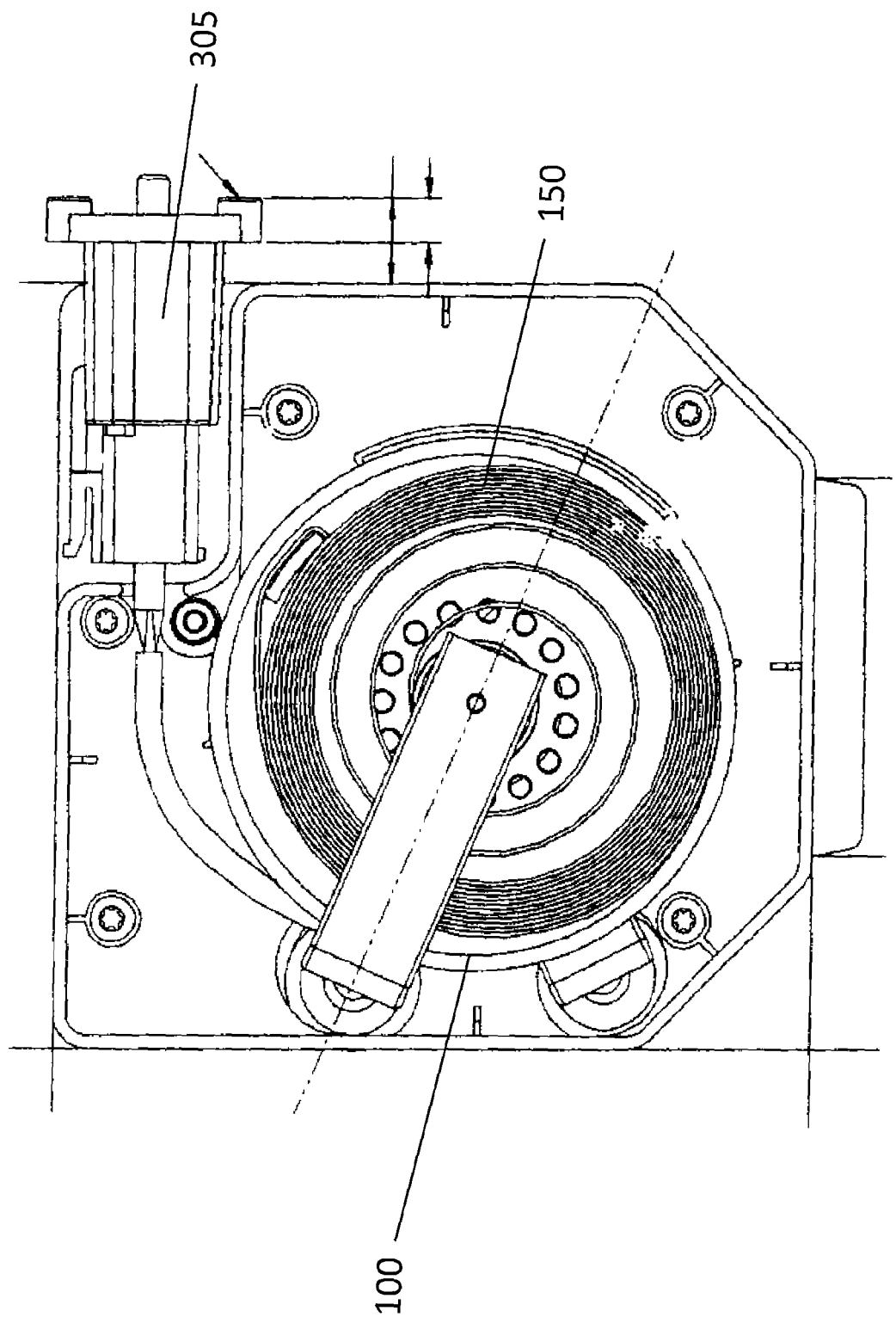
FIG. 2 is a top planar view of the reel of the present invention, showing the reel with a top cover removed.
Figure 3:
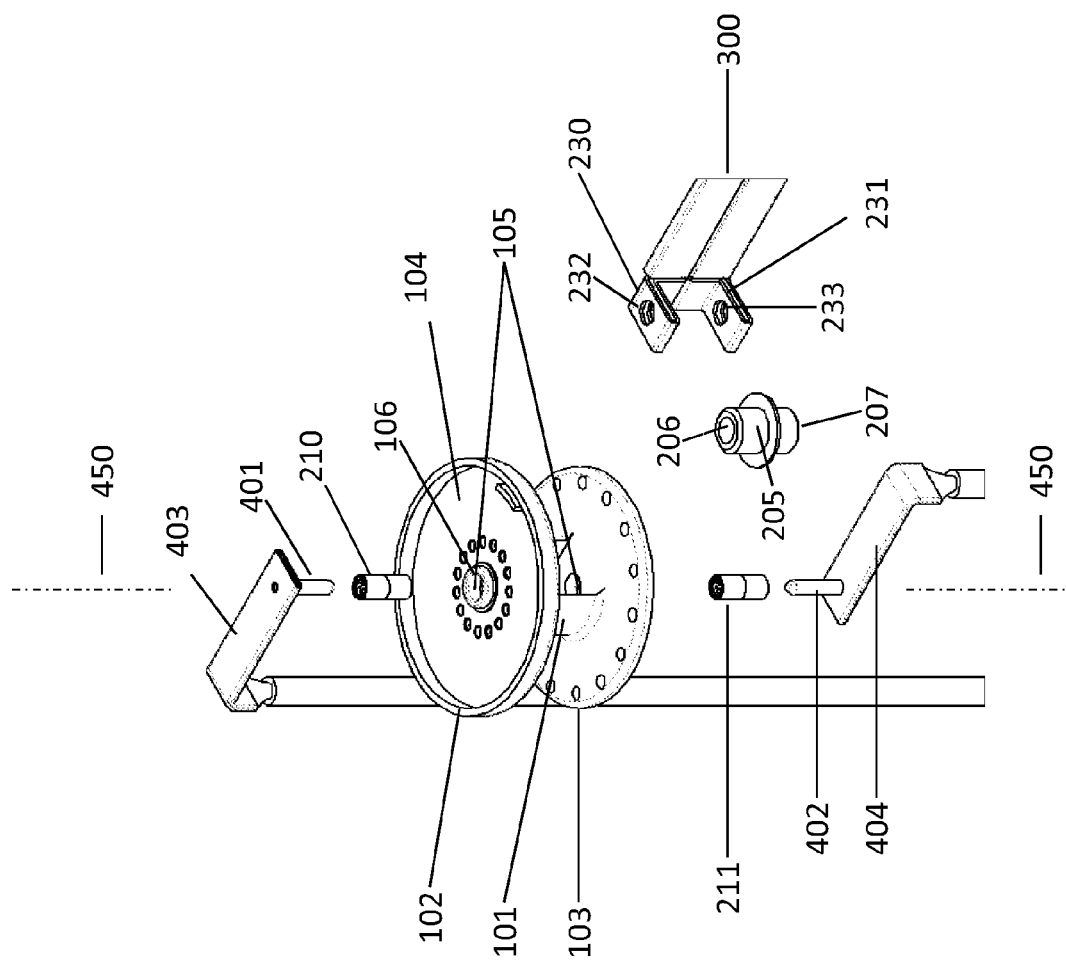
FIG. 3 is an exploded perspective view of a cable connection assembly of the reel of the present invention.
Figure 4:
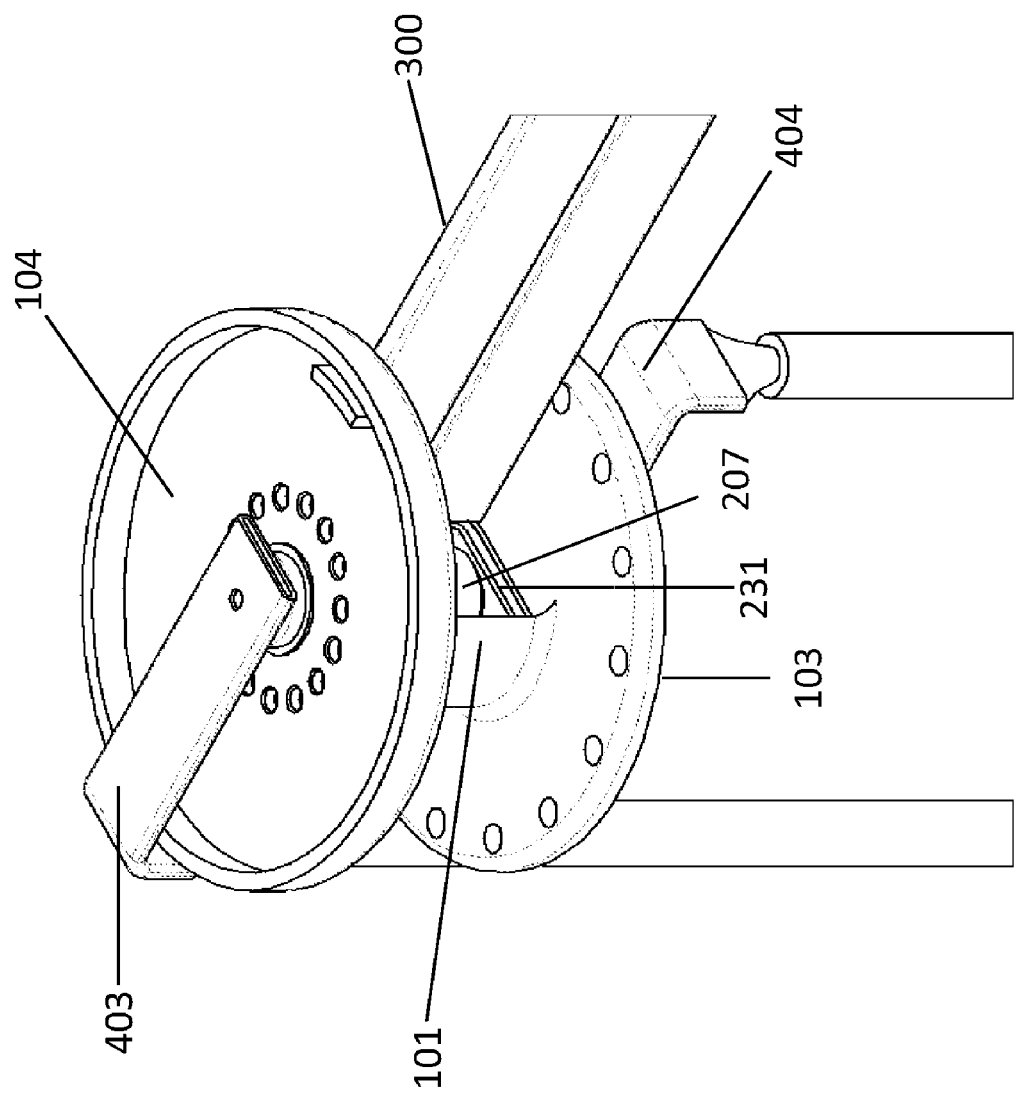
FIG. 4 is a partial perspective view of the assembly illustrated in FIG. 3.

As seen in FIG. 3, the reel housing 100 may be formed by first and second planar members 102 and 103 separated by a partial cylindrical member 101. The first and second planar members 102 and 103 each may have a centered circular hole 105, the holes being coaxially aligned. The first planar member 102 may have a recessed area 104 on the side opposite the partial cylindrical member 101 for securing a biasing member 150 (shown in FIGS. 1-2). The biasing member 150 may be in the form of a coil spring or torsion spring. The circular hole 105 for the first planar member 102 also may have insulation 106 around the hole to provide an insulative barrier between the biasing member 150 and the return barrel terminal 210.

The partial cylindrical member 101 provides a protected area for housing the assembly 200 that may be used to connect the cable 300 to a power source. The partial cylindrical member 101 also may provide support for wrapping the cable 300 around the inside of the reel housing 100 between the first and second planar members 102 and 103, as shown in FIG. 1.

Figures 6, 7:
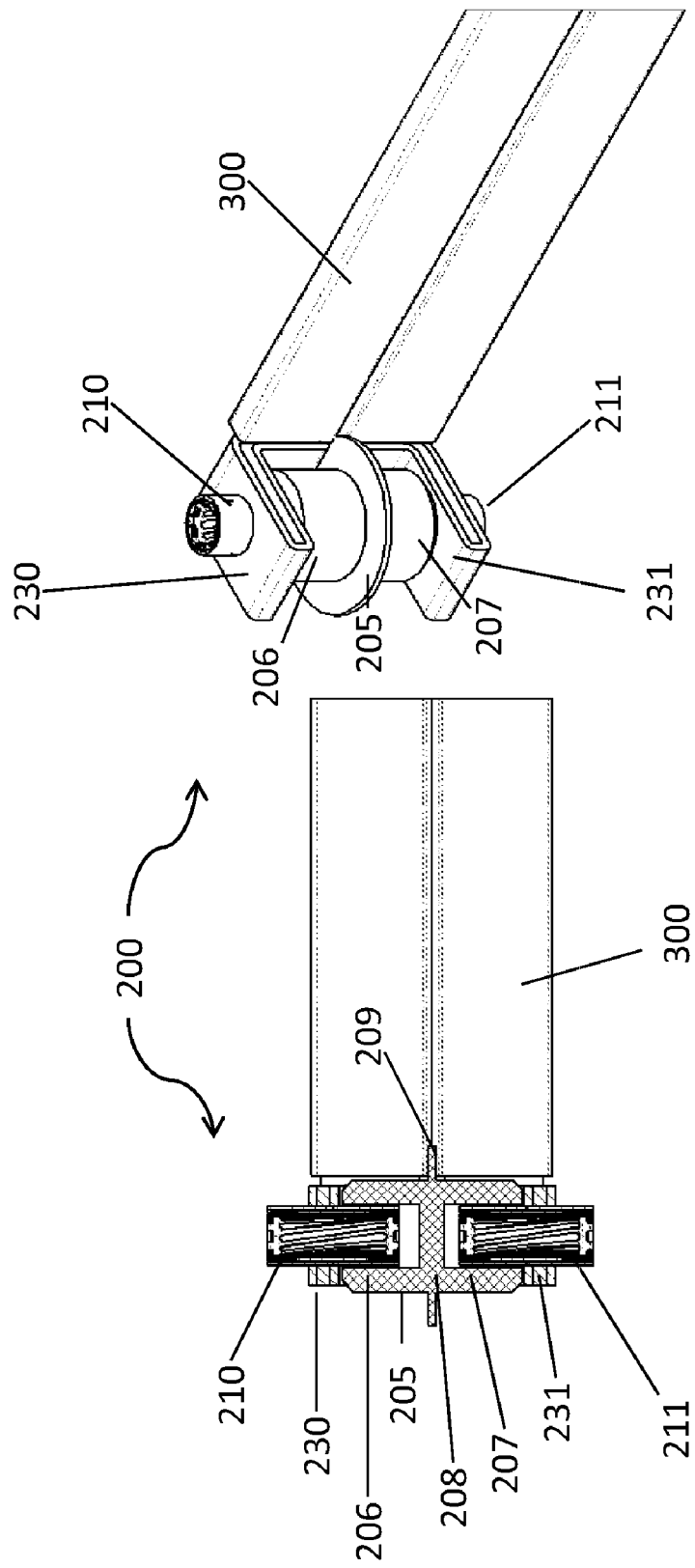
FIG. 6 is a cross-sectional view showing the barrel terminals placed in the insulator and the barrel terminals coupled with cable connector of a cable.
FIG. 7 is a perspective view of the barrel terminals, insulator, cable connectors and cable, shown in FIG. 6.
Figure 9:
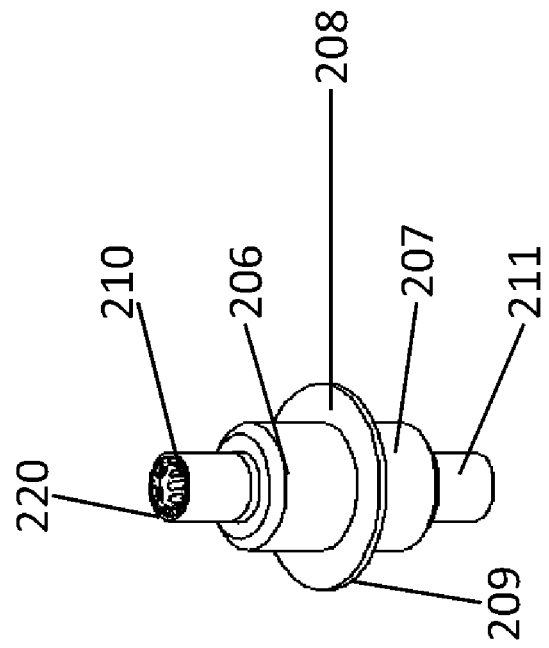
FIG. 9 is a perspective view of the insulator and the barrel terminals shown in FIG. 8, showing the barrel terminals placed in the insulator.
Figure 8:
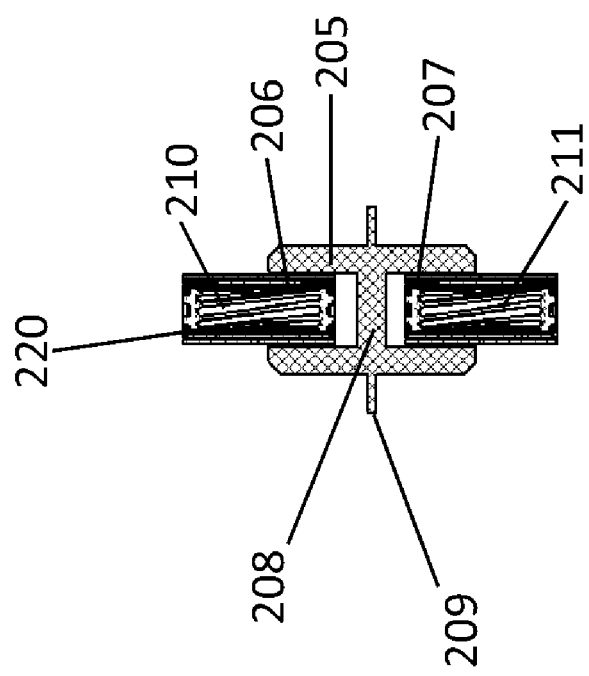
FIG. 8 is a cross-sectional view of barrel terminals of the reel without the cable and cable connectors, showing the barrel terminals placed into an insulator.
Figure 10:
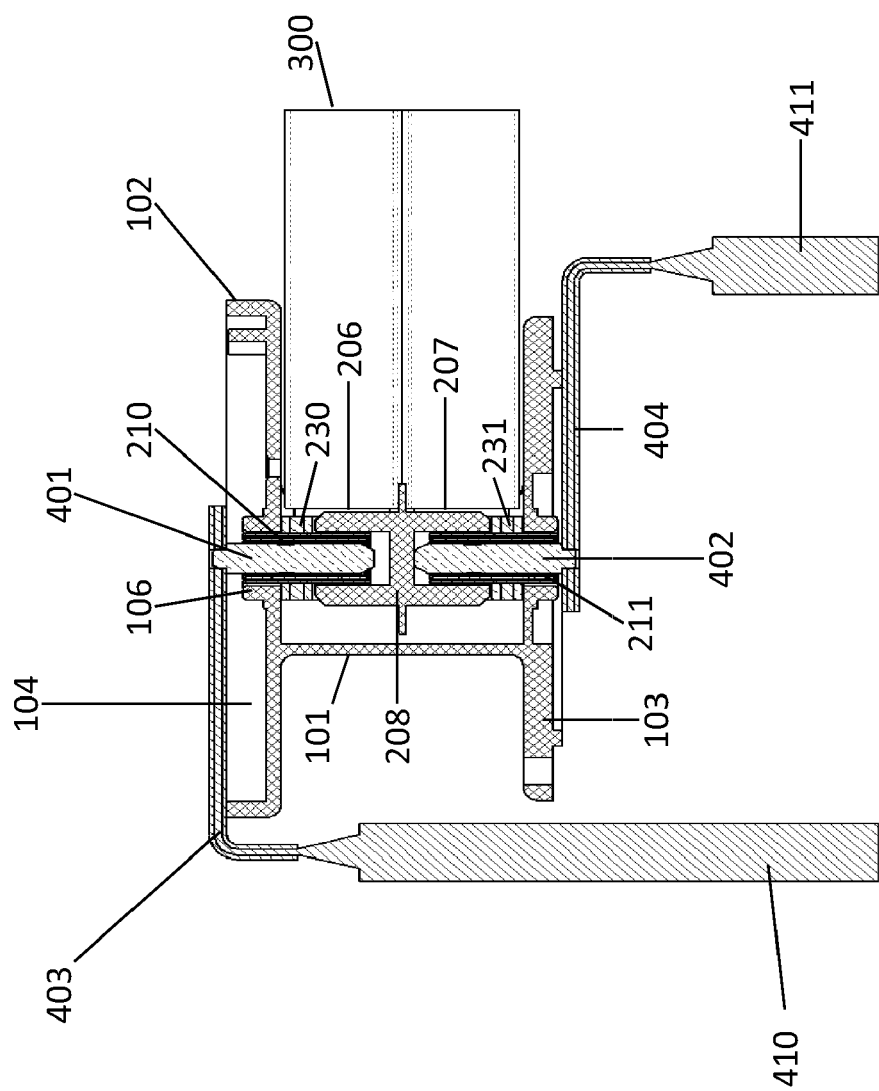
FIG. 10 is a cross-sectional view of the reel showing the reel assembled with the cable.

As seen in FIG. 6, the assembly 200 for connecting the cable 300 may have an insulator 205, a return barrel terminal 210, a power barrel terminal 211, a return cable connector 230, and a power cable connector 231.

The insulator 205 may have a first recess 206 for receiving a portion of the return barrel terminal 210 and a second recess 207 for receiving a portion of the power barrel terminal 211. The insulator may be made of any nonconductive material, such as plastic. The first recess 206 and the second recess 207 preferably provide a tight fit for the barrel terminals 210 and 211 such that the barrel terminals 210 and 211 do not rotate within the recesses 206 and 207, respectively. In this embodiment the insulator 205 may be symmetrically divided into the first recess 206 and the second recess 207 with an insulative middle portion 208 situated between the first recess 206 and the second recess 207. The insulative middle portion 208 also may have a portion 209 that extends beyond the overall cylindrical shape of the insulator 205 to provide insulation between the return cable connector 230 and the power cable connector 231.

As seen in FIG. 3, the barrel terminals 210 and 211 of the assembly are preferably radially resilient electrical sockets that may have an internal hollow cylindrical sleeve 220 for receiving contacts 401 and 402. The hollow cylindrical sleeves 220 (FIG. 8) may be formed by adding contactor strips to the inside of the barrel, as described in commonly owned U.S. Pat. No. 4,734,063, herein incorporated by reference. The contactor strips may provide a continuous electrical connection to an inserted objected, such as the contacts 401 and 402, while permitting the contacts 401 and 402 to rotate within the cylindrical sleeve 220. The barrel terminals 210 and 211 may operate up to and including 1,000 amps. The purpose of the barrel terminals 210 and 211 is to provide a robust and continuous electrical connection at the core of the assembly 200 between the cable connection 230 and 231 and the power connection contacts 401 and 402 in a configuration that allows the reel 50 to rotate around the contact contacts 401 and 402 in the barrel terminals 210 and 211 without power loss. This novel concept of implementing barrel terminals 210 and 211 in a connection assembly 200 provides a compact and high amperage cable connection solution that may be easily assembled.

The return cable connector 230 and the power cable connector 231 provide the electrical connection point between the assembly 200 and the cable 300. As seen in FIGS. 3 and 7, return cable connector 230 and power cable connector 231 may be substantially "L" shaped conductive pieces made of an electrically conductive material. The electrically conductive material is not limited to but may be copper or aluminum. Each of the return cable connector 230 and the power cable connector 231 respectively may have a centered circular opening 232 and 233 large enough to allow the insertion of the respective barrel terminals 210 and 211.

As seen in FIGS. 1, 2 and 5, the end of the cable 300 opposite the assembly 200 may have a locking connector plug 305 for connecting the cable 300 to a locking connector 310. The locking connector 310 is attachable to the device to be powered by the cable 300. The locking connector plug 305 locks into the locking connector 310 by pushing the connector plug 305 into a snap-in mechanism. Other suitable connector plugs and connectors may be used such as nylon force fit plugs or circular connectors. The locking connector plug 305 may be manually released by depressing the snap-in mechanism to disengage the locking connector plug 305 from the locking connector 310. The purpose of the locking connector plug 305 is to insure that the locking connector plug 305 will not be pulled out of the locking connector 310 when the drawer is opened and the cable 300 is unwound from the reel housing 100, against the constant pressure supplied by the biasing member 150.

Referring to FIGS. 3, 6 and 7, the assembly 200 may be assembled by attaching the return cable connector 230 and the power cable connector 231 to the cable 300 by a crimping process. The insulator 205 may be inserted between the return cable connector 230 and the power cable connector 231 aligning the first recess 206 opening with the return cable connector circular opening 232 and aligning the second recess 207 opening with the power cable connector opening 233. The combined insulator 205 and cable 300 configuration may be inserted through the opening in the partial cylindrical member 101 between the first planar member 102 and the second planar member 103 aligning the return cable connector circular opening 232 and power cable connector circular opening 233 with the centered coaxial circular openings 105. The power barrel terminal 211 may be inserted through the opening 105 on the second planar member 103 and through the power cable connector opening 233 into the second recess 207 of the insulator 205. The return barrel terminal 210 then may be inserted through the opening 105 on the first planar member 102 and through the return cable connector opening 232 into the first recess 206 of the insulator 205. The biasing member 150 may be added to the first planar 102 biasing member area 104 either before or after the assembly 200 is assembled.

As seen in FIGS. 3, 4, 8 and 10, power from power output member 411 and return output member 410 may be provided via return lug portion 403 and power lug portion 404 connected to return and power contacts 401 and 402 to the assembly 200 by inserting a power contact 402 into the hollow cylindrical sleeve 220 of the power barrel terminal 211 and by inserting return contact 401 into the hollow cylindrical sleeve 220 of the return barrel terminal 210 along axis 450. The power contact 401 and return contact 402 may be in the form of a pin.

While a particular embodiment has been chosen to illustrate the invention, it will be understood by those skilled in the art that various changes and modifications can be made therein without departing from the scope of the invention as defined in the appended claims.

What is claimed is:

1. A reel comprising:
a power output lug portion having a power pin contact;
a return output lug portion having a return pin contact;
a winding reel housing having a coil spring mechanism, said housing having a center cylinder with an opening; and
an assembly received in said opening of said center cylinder for connecting a cable to said power pin contact and said return pin contact, said assembly having an insulator symmetrically divided into opposite first and second recesses, said first recess being adapted to receive at least a portion of a return barrel terminal and said second recess being adapted to receive at least a portion of a power barrel terminal, and said assembly having a return cable connector and a power cable connector, said return cable connector being configured to couple to said return barrel terminal, and said power cable connector being configured to couple to said power barrel terminal, said return barrel terminal being inserted into said return cable connector circular opening and said return pin contact being inserted into said return barrel terminal, and said power barrel terminal being inserted into said power cable connector circular opening, and said power pin contact being inserted into said power barrel terminal;
wherein said return pin contact rotates with respect to said return barrel terminal while maintaining electrical contact with said return barrel terminal and said power pin contact rotates with respect to said power barrel terminal while maintaining electrical contact with said power barrel terminal.

2. A reel of claim 1, wherein said return barrel terminal and said output barrel terminal are radially resilient electrical sockets having a hollow cylindrical sleeve, and said cylindrical sleeve has a plurality of elongated contactor strips.

3. A reel of claim 1, wherein said first and second recesses of said insulator receive said return and power barrel terminals, respectively, in a tight fit.

4. A reel of claim 1, wherein said power output member has a power output lug portion substantially perpendicular to said power contact and said return output member has return output lug portion substantially perpendicular to said return contact.

5. A reel of claim 1, wherein each of said return barrel terminal and said power barrel terminal operates up to and including 1,000 amps.

6. A reel of claim 1, wherein said biasing member is a coil spring.

7. A reel of claim 1, wherein said biasing member is a torsion spring.

8. A reel of claim 1, wherein said return barrel terminal and said output barrel terminal are radially resilient electrical sockets having a hollow cylindrical sleeve, and said cylindrical sleeve has a plurality of elongated contactor strips.

9. A reel of claim 1, wherein said power output lug is substantially perpendicular to a power output member, and power return lug is perpendicular to a return output member.

10. A reel of claim 1, wherein said return barrel terminal and said power barrel terminal operate up to and including 1,000 amps.

11. A reel of claim 1, wherein a cable is connected to said return cable connector and said power cable connector of said assembly.

12. A reel of claim 1 wherein said cable has a locking connector plug at the opposite end of said cable from said assembly, said cable is pulled from the reel in a direction and released back to the reel in an opposite direction.

13. A reel of claim 1 wherein each of said first and second recesses of said insulator has a shape to accommodate barrel terminals and hold said barrel terminals in a tight fit.

14. A reel of claim 1, wherein said housing has a first planar member, a second planar member and a partial cylindrical member therebetween, said first planar member has a centered circular opening of at least a circumference to receive said return barrel terminal and said second planar member has a centered circular opening of at least a circumference to receive said power barrel terminal, said circular openings being co-axial.

15. A reel of claim 14, wherein said first planar member has a recessed area on a side opposite said partial cylindrical member, said recessed area is formed to accept said biasing member.

16. A reel of claim 1, wherein said assembly has power and return cable connectors, said return barrel terminal is inserted in a first circular opening in said return cable connector, and said power barrel terminal is inserted in a second circular opening in said power cable connector.

17. A reel of claim 16, wherein a cable is connected to said return cable connector and said power cable connector of said assembly.

18. A reel of claim 17, wherein said cable has a locking connector plug opposite said assembly for securely connecting said cable to power receiving device.

19. A reel of claim 17, wherein said cable is pulled from the reel in a first direction and released back to the reel in an opposite second direction.

* * * * *